Dec. 28, 1954  A. R. YODER  2,697,957
CLAMPING DEVICE FOR WELL DRILLING STEMS OR PIPE
Filed April 28, 1954
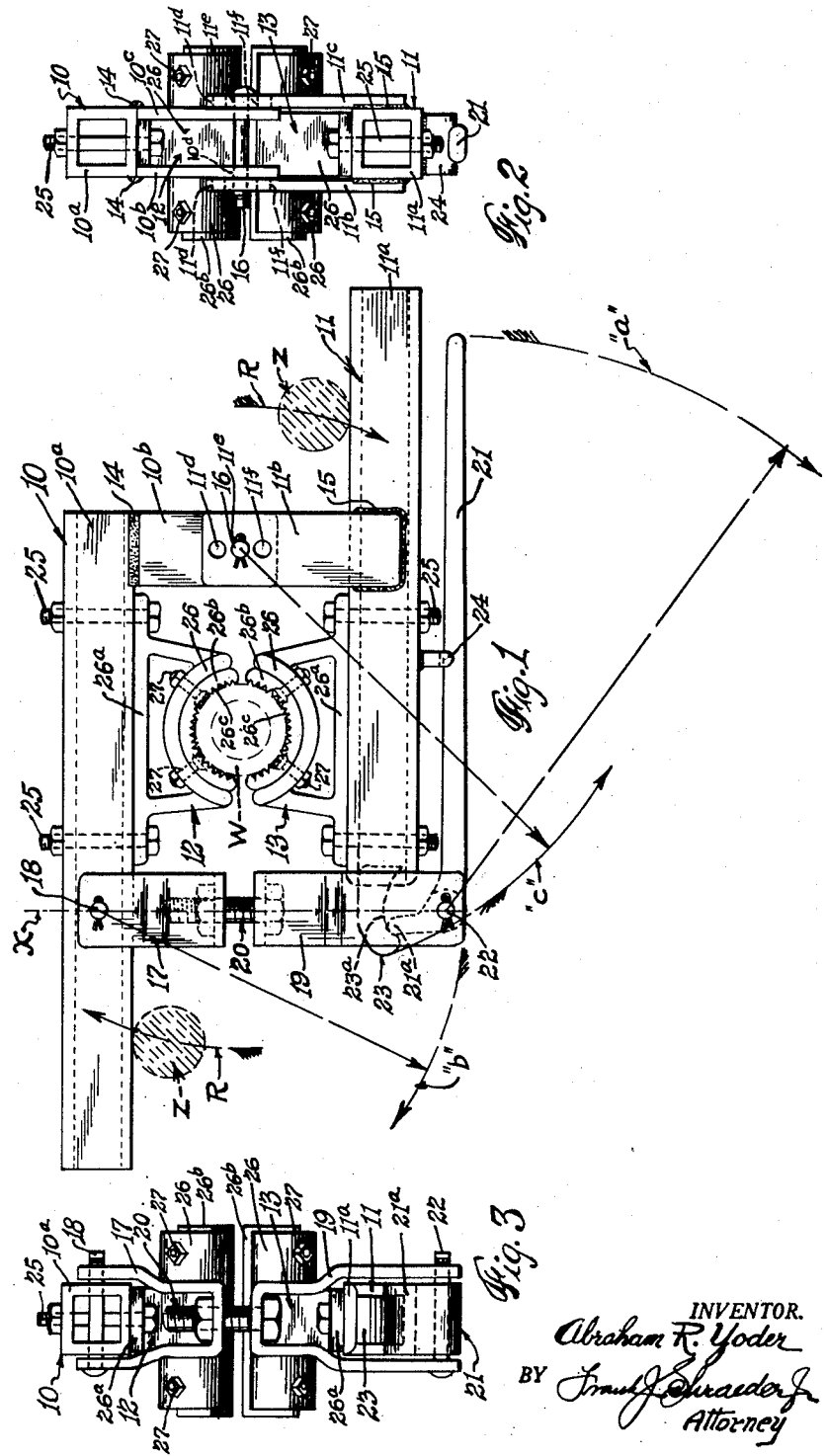
INVENTOR.
Abraham R. Yoder
BY
Frank J. Schraeder Jr.
Attorney

United States Patent Office

2,697,957
Patented Dec. 28, 1954

2,697,957
CLAMPING DEVICE FOR WELL DRILLING STEMS OR PIPE

Abraham R. Yoder, Hutchinson, Kans.

Application April 28, 1954, Serial No. 426,100

6 Claims. (Cl. 81—53)

This invention generally relates to a clamping device adapted for use in gripping a drill stem or pipe for rotating the same about its longitudinal axis as in drilling oil or water wells or for use as a secure holding clamp for retaining a lower section of a stem or pipe in stationary position while an upper section is being coupled to or uncoupled from the lower section.

The invention is particularly adapted for use on and in connection with power-driven rotary tables commonly employed in well drilling operations where sections of drill stems are successively added to lengthen the same, or where the sections of the drill stems or pipe are progressively successively uncoupled as they are withdrawn from a borehole; in such drilling operations the improved clamping device being used as a quickly attachable or detachable coupling for transmitting the rotary power from the table to the drill stem or pipe.

Whether drill stems or pipe sections are being successively added to or removed from an assembled length of such sections, an object of my invention is to provide a secure clamping device that shall be quickly attachable to or quickly demountable from such drill stem or pipe sections for rotating the same about their longitudinal axes or for functioning as a holding clamp to retain a section in stationary position while an adjacent section is being secured to or uncoupled therefrom.

Another object of my invention is to provide a clamping device of the above described character that shall be simple in construction, comparatively low in cost of manufacture and efficient in use as a time-saving clamp.

The various features of novelty whereby the present invention is characterized will hereinafter be pointed out with particularity in the claims, but, for a full understanding of the invention and of its objects and advantages, reference may be had to the following detailed description taken in connection with the accompanying drawing wherein:

Fig. 1 is a plan view of a clamping device embodying my invention and Figs. 2 and 3 are end views of the same.

As illustrated in the drawing, the clamping device includes an L-shaped arm 10, a T-shaped arm 11, clamping members 12 and 13 carried by the arms and interposed between said arms, links adjustably connecting the arms, and a clamping-force-applying and retaining lever.

The L-shaped arm 10 preferably consists of a tubular metallic member $10^a$ of square cross-section which is provided with a link section at one end thereof preferably comprising a pair of transversely spaced parallel bars $10^b$ and $10^c$ welded, as at 14, to the inner face of the arm member $10^a$ with the outer faces of the link bars $10^b$ and $10^c$ flush or in plane alignment with a pair of opposed faces of the member $10^a$.

The T-shaped arm 11 preferably consists of a tubular metallic member $11^a$ of square cross-section which is provided intermediate its ends with a link section preferably comprising a pair of transversely spaced parallel link bars $11^b$ and $11^c$ welded, as at 15, to opposed faces of the arm member $11^a$ so that the inner faces of the link bars $11^b$ and $11^c$ overlap and engage the outer faces of the link bars $10^b$ and $10^c$ of the arm member $10^a$; the parallel set of bars $10^b$ and $10^c$ being pivotally linked to the parallel set of bars $11^b$ and $11^c$ by a bolt 16 thus pivotally linking together the two clamp arms 10 and 11.

The link bars $10^a$ and $10^b$ are each provided with a hole $10^d$ which are adapted to register with a selected one pair of transversely aligned holes $11^d$ or $11^e$ or $11^f$ in the link bars $11^b$ and $11^c$ through which may extend the pivot bolt 16. While the arms 10 and 11 are adjustably linked together by pairs of bars welded to the tubular members $10^a$ and $11^a$ it is obvious that the arms 10 and 11 may be made as solid unitary members of any desirable cross-section with the links $10^b$ and $10^c$ cast or otherwise formed as a single link integral with the arm 10 and likewise that the links $11^b$ and $11^c$ may be cast or otherwise formed as a single link integral with the arm 11; the overlapping portions of such links being of tongue and groove construction pivotally connected by the bolt 16.

In either construction, the links $10^b$ and $10^c$ may be considered as constituting the short right-angular extension of the L-shaped arm 10 and the links $11^b$ and $11^c$ as constituting the stem portion of the T-shaped arm 11.

While the arms 10 and 11 may be substantially of equal length and while in clamping positions these arms may be parallelly aligned longitudinally of each other, their arrangement in the device is such that one end of each arm extends longitudinally beyond the corresponding end of the other arm. It will also be noted that in such arrangement the intermediate portion of each arm is link-connected to one end of the other arm when the device is in clamping operation, thus, the links $10^b$, $10^c$, $11^b$ and $11^c$ connect the intermediate portion of the arm 11 with an end of arm 10.

An intermediate portion of arm 10 is releasably connected to an end of arm 11 by an adjustable link member comprising a U-shaped link 17 pivotally connected to arm 10 by a bolt 18 and a relatively inverted U-shaped link 19 including a bolt 20 adjustably connecting together both links 17 and 19.

The inner end of arm 11 is terminated short of a centerline designated by X passing through the center of the links 17 and 19 and bolts 18 and 20 to thus provide clearance for the operative end of the clamping-force-applying and retaining lever 21 which is pivotally mounted on bolt 22 carried by the link 19.

The pivotally supported inner end of the lever 21 is formed with a comparatively short relatively angularly disposed integral finger $21^a$ which, when the lever 21 is in clamp-operating position as shown in Fig. 1, engages with the curved face $23^a$ of a metallic seat 23 that is securely welded to and projects from the interior of the inner end of the arm 11; the finger $21^a$ and the seat face $23^a$ being so arranged that when the lever 21 is in clamp-operating position as shown in Fig. 1, the outer or free end of the finger $21^a$ is positioned toward the left of and beyond the center-line X to thereby retain the lever 21 in toggle-locked clamping position while the arm of the lever 21 is engaged in its seat 24 which is welded to the arm 11.

The inner opposed faces of the arms 10 and 11 are provided with respectively clamp members 12 and 13 which are removably secured to the arms as by bolts 25. The clamp members 12 and 13 are similar in construction and are secured to the arms 10 and 11 between the spaced sets of link members as shown in Fig. 1.

Each clamping member consists of a clamp jaw 26 of substantially semi-circular shape having an integral base portion $26^a$ that is adapted to be secured to its respective clamp arm by the bolts 25. To provide for wear of the clamp jaws 26, I prefer to provide each of the jaws 26 with a renewable arcuate liner $26^b$ preferably made with a serrated face $26^c$ and removably secured to the jaw by bolts 27.

The liners $26^b$ may be of any suitable metal, however, I have successfully employed liners made from comparatively thick canvas or rubber-impregnated canvas or comparatively thick conveyor belting of canvas or leather.

As shown more clearly in Figs. 2 and 3, I prefer to provide each clamping member with an enlarged gripping or contact area and, therefore, each jaw 26, and its liner $26^b$, extend outwardly beyond the opposite sides of the clamp member base structure.

The portions of the arms 10 and 11 that extend outwardly in opposite directions beyond their two sets of connecting links function to provide extensions adapted to be grasped by the operator's hands for manually turning a drill stem or pipe designated by W or, in operations wherein the device is employed with a rotary table, these extensions are conveniently adapted to be engaged and the entire clamp device rotated by suitable vertically disposed power-driven pins designated by Z; the direction of rotation of the device being indicated by the arrows R.

As shown in Fig. 1, the clamping device is shown in position clampingly secured to a drill stem or pipe W. To quickly uncouple the device from the stem or pipe, the lever 21 is moved outwardly in the direction of the arrow "a" about its pivot pin 22 to thereby release finger 21ª from its secure "past center" engagement with its seat 23 whereupon the links 17 and 19 together with the lever 21 may be easily swung outwardly about the pivot bolt 18 in the direction of the arrow "b" while simultaneously the T-shaped arm 11 together with its clamping member 13 may be swung outwardly about its pivot bolt 16 in the direction of arrow "c" thereby uncoupling the clamping jaws from the stem or pipe W.

It will be observed from the adjustable features provided between the links 10ᵇ, 10ᶜ and 11ᵇ, 11ᶜ and, between the links 17 and 19 by means of the bolt 20, that the device is readily adapted for use as a clamp for drill stems and pipe of various diameters by simply removing the bolts 25 and interchanging clamping members 12 and 13 for a similar pair of clamping members of a size to accommodate a smaller or larger diameter of stem or pipe.

While I have illustrated in the drawing a preferred embodiment of the invention, it will be apparent to those skilled in the art to which the invention appertains that various modifications may be made in the dimensions, shapes and proportions of the members of the present device without departing from the scope of the invention defined in the appended claims.

I claim:

1. A clamp device of the kind described comprising a pair of relatively transversely spaced elongated arms normally disposed, when in clamping position, in substantially parallel alignment, a first link member pivotally connecting an end of one of said arms with the other one of said arms, a second link member pivotally connected at one end thereof to said one of said arms, coacting clamp jaws carried on opposed sides of said arms between said link members adapted to clampingly engage opposite sides of a cylindrical element, and toggle means pivotally supported on the opposite end of said second link member adapted to releasably interlock said second link member with an adjacent end of said other one of said arms when said jaws are clampingly engaged with said cylindrical element by the action of said toggle means.

2. A clamp device of the kind described comprising a pair of relatively transversely spaced elongated arms normally disposed, when in clamping position, in substantially parallel alignment with one end of each arm extending longitudinally beyond the corresponding end of the other arm to provide extended leverages for rotating the device, a first link member pivotally connecting an end of one of said arms with the longitudinally extended end of the other one of said arms, a second link member pivotally connected at one end thereof to the longitudinally extended end of said one of said arms, coacting clamp jaws carried on opposed sides of said arms between said link members adapted to clampingly engage opposite sides of a cylindrical element, and toggle means pivotally carried on the opposite end of said second link member adapted to releasably interlock said second link member with an adjacent end of said other one of said arms when said jaws are clampingly engaged with said cylindrical element by the action of said toggle means.

3. A clamp device of the kind described comprising an L-shaped arm, a T-shaped arm having its stem portion pivotally and adjustably link-connected to the short portion of the L-shaped arm, said arms being so arranged that the long portion of the L of the L-shaped arm and the cross portion of the T of the T-shaped arm are normally disposed, when the device is in clamping position, in substantially parallel alignment, a longitudinally adjustable link member pivotally connected at one end to the long portion of the L-shaped arm, a pair of coacting clamp members having arcuate jaws adapted to frictionally engage opposite sides of a cylindrical element, one of said clamp members being detachably secured to said long portion of said L-shaped arm and the other of said clamp members being detachably secured to the cross portion of said T-shaped arm, a seat having an arcuate face secured to one end of said cross portion of said T-shaped arm, and a clamping-force-applying lever pivotally secured at one end thereof to the opposite end of said link member, said lever having an integral finger projecting from one end thereof adapted to engage the face of said seat at a point beyond the longitudinal center-line of said link to thereby releasably toggle-interlock said arms when said jaws are clamped to said cylindrical elements responsively to the clamping-force-applying movement of said lever.

4. A clamp device as set forth in claim 3 wherein said parallelly aligned portions of said arms are so arranged that one end of said portion of one arm extends longitudinally beyond the corresponding end of said portion of the other arm to thereby provide extended leverages for rotating the device.

5. A clamp device as set forth in claim 3 wherein said L-shaped arm comprises a tubular member and a link section welded to one end thereof and wherein said T-shaped arm comprises a tubular member and link section welded to an intermediate portion thereof, said link sections being pivotally connected together, and wherein said adjustable link member comprises a U-shaped link pivotally connected to an intermediate portion of the tubular member of said L-shaped arm, a relatively inverted U-shaped link to which said lever is pivotally connected, and a threaded bolt adjustably connecting said U-shaped links.

6. A clamp device of the kind described comprising a pair of relatively transversely spaced elongated arms normally disposed, when in clamping position, in substantially parallel alignment, a longitudinally adjustable link connecting an intermediate portion of each arm with an end of the other arm, a pair of clamp jaws carried respectively on opposed sides of said arms between said links, and a lever-actuable toggle joint interposed between an end of one of said links and an end of one of said arms, the other one of said links constituting a pivotal connection between said arms.

References Cited in the file of this patent

UNITED STATES PATENTS

| Number | Name | Date |
|---|---|---|
| 1,421,065 | Callan | June 27, 1922 |
| 1,925,970 | Pennington | Sept. 5, 1933 |
| 2,067,626 | Benninghoff | Jan. 12, 1937 |
| 2,311,225 | Grable | Feb. 16, 1943 |
| 2,466,422 | Hartley et al. | Apr. 5, 1949 |